Nov. 17, 1942.  J. E. MICHAUD  2,302,240
WATER FILTER
Filed Nov. 28, 1939
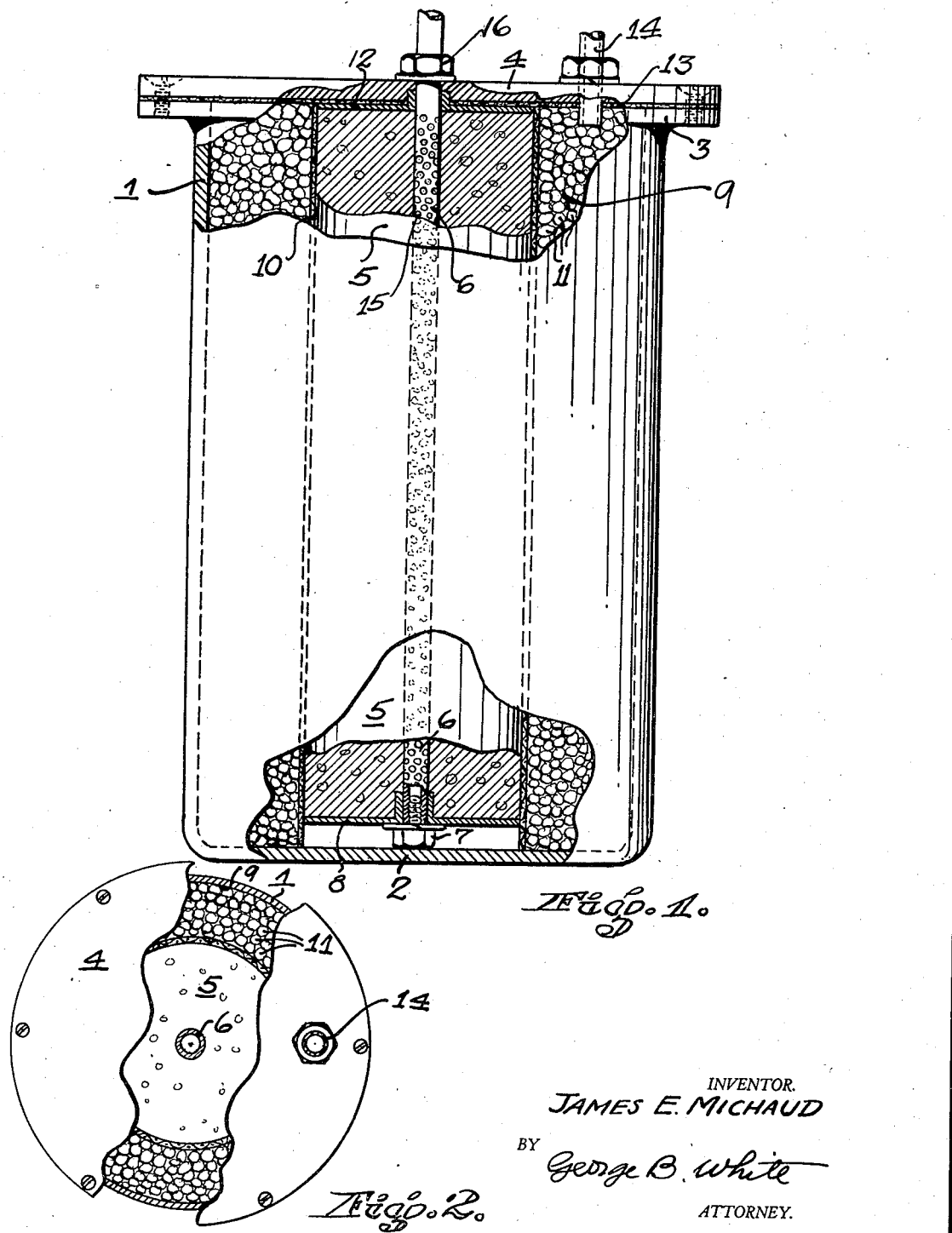
INVENTOR.
JAMES E. MICHAUD
BY George B. White
ATTORNEY.

Patented Nov. 17, 1942

2,302,240

UNITED STATES PATENT OFFICE 2,302,240

WATER FILTER

James E. Michaud, San Francisco, Calif.

Application November 28, 1939, Serial No. 306,477

7 Claims. (Cl. 210—102)

This invention relates to water filters and purifiers.

An object of this invention is to provide a compact, simple and light filter and purifier unit which can be readily assembled near a water dispenser and connected between the water supply and the outlet or the cooler, and which occupies comparatively small space, and is easily taken apart and assembled for the replacement and the cleaning of its parts or purifying layers, and efficiently treats the water flowing therethrough.

Another object of this invention is to provide a water filter and purifier in which a loose layer and a solid layer are separated from each other so as to allow the flow of water through said layers but prevent the loose layer from falling into the space occupied by the solid layer.

Another object of this invention is to provide a water filter or purifier in which a solid stone core has a central passage and is surrounded by a casing which transmits water; outside of which casing is the lose filter or purifier material, the stone being so packed at its ends as to limit the water seepage or flow through the sides of the stone and through said central passage.

Another object of this invention is to provide a water filter and purifier wherein a central solid member is removable and the space occupied by said solid layer is shielded from a surrounding loose layer of material, the inlets and outlets of said unit are so arranged that the water must flow through all the layers before dispensed.

Other objects and advantages are to provide a water filter that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in any of the claims following the description, it is desired to cover the invention in whatsoever form it may be embodied.

This invention is clearly illustrated in the accompanying drawing wherein:

Fig. 1 is partly sectional view of my water filter and purifier unit, and

Fig. 2 is a partly sectional top plan view of the unit.

In its general organization my invention includes a solid layer and a loose layer of filtering and purifying materials separated from each other by a protector layer adapted to allow water flow therethrough but not to allow the loose material of the loose layer throught it. In its preferred form my invention includes a plurality of concentrically arranged layers, including solid and loose layers. This is accomplished by providing a separating insert between the loose and the solid layers, said insert being adapted to allow the flow of water therethrough.

In the preferred embodiment of my invention I provide a housing 1. The bottom 2 of the housing 1 is closed and its flanged top 3 is open. A cover 4 is suitably secured over the open flanged top 3. Inside the housing are the concentric filter and purifier layers. The solid layer is a porous stone 5 which in this illustration is cylindrical and is centrally positioned in the housing 1. The stone 5 is axially placed and extends from the level of the flanged top 3 to a point spaced above the bottom 2 of the housing 1. Thus the stone 5 can be axially removed and replaced in the housing.

A central and axial outlet conduit 6 is extended through the entire length of the stone 5. The conduit 6 is perforated so as to collect water seeping through the body of the stone 5. In the end of the conduit 6 adjacent the bottom 2 is a securing element such as a bolt 7 the head of which bears against a packing plate 8 on the bottom of the stone 5. The conduit 6 protrudes well beyond the top of the stone 5 so that it may be gripped and used as a handle for lifting the stone 5 out of the housing 1. In this manner the removal and replacement of the stone 5, independently of the other layers of the filter, is facilitated.

The outer periphery of the cylindrical stone 5 is spaced from the periphery of the outer housing 1 thereby to form a circumferential space 9. The stone is surrounded by a screen 10. The screen 10 is preferably also cylindrical and it extends from the top 3 to the bottom 2 of the housing 1 immediately adjacent to the periphery of the stone 5. The circumferential space 9 between the screen 10 and the housing 11 is filled with a concentric layer of loose filter material 11, such as charcoal.

In order to compel the flow of water through the sides of the stone the top ends of the stone 5 is also suitably packed and protected by a top packing 12 which partly extends as a recessed bushing around the conduit 6. The top of the entire unit is packed by a suitable gasket 13 held in place by the cover 4. The conduit 6 is connected to a line outside of the unit leading to an olla, cooler, or other dispenser or faucet for the water. The water is introduced into the loose layer 11 through an inlet conduit 14 which is suitably secured in position in the cover 4 so as to discharge into the charcoal.

When the unit is assembled the inlet conduit 14 is connected to a water supply. The water flows into the charcoal layer 11. Then the water seeps through the charcoal layer 11 and through the protective screen 10 into the sides of the stone 5. The water then flows through the perforations 15 of the outlet conduit 6 and collects therein so as to flow upwardly and out through the conduit 6 and to a dispenser. During the passage of the water through the layers of my filter the impurities are deposited and the water is rendered clear and sparkling.

In order to remove the layers from the unit for cleaning or replacement the conduits 6 and 14 are disconnected. As the cover is removed the stone 5 is lifted therewith out of the housing 1 by pulling on the upper end of the outlet conduit 6. Thus the stone 5 is taken out without disturbing the loose layer 11. The lock nut 16 on the conduit 6 bearing against the top of the cover 4 holds the stone 5 onto the cover 4 so that the stone 5 is removed with the cover 4 while the locknut 16 is in position. The screen 10 protects the space of the stone 5 from the loose material. The loose layer or charcoal 11 may be also removed independently of the other layers. In this manner any part of the filter and purifier unit can be removed, washed out, cleaned or replaced without in any way affecting the adjacent layers. The filter and purifier device of my invention is simple to install, it does not require any adjustments and its components can be independently removed, replaced or cleaned. While the water is effectively filtered and purified yet it can flow through the layers herein in sufficient volumes to render the device particularly practical in connection with dispensers where continuous supply of clear and cool drinking water is provided from the usual house lines.

Having thus described my invention what I now claim and desire to secure by Letters Patent is:

1. In a purifier and filter device comprising a housing, a central solid porous body in said housing, a loose layer of filtering and purifying material disposed between the sides of said solid body and the periphery of the housing, the tops of the solid body and of the loose layer being so aligned as to leave the top of the solid body exposed separately from the loose layer, a screen surrounding said solid body for separating said loose layer from said body, an inlet into said loose layer, and an outlet from said solid body.

2. In a purifier and filter device a housing, a porous stone positioned in said housing in spaced relation from the periphery of the housing so as to be movable endwise, a screen around the outer periphery of the stone, a layer of charcoal between the screen and the periphery of the housing, the level of said layer being at about the end of the screen so as to leave the end of said stone uncovered by charcoal, an inlet for the fluid into said charcoal layer, and an outlet to conduct the filtered fluid from the stone.

3. In a purifier and filter device a housing, a loose layer of charcoal adjacent the periphery of the housing extending from top to bottom, a screen separator wall extended from top to bottom into said charcoal layer so as to confine the charcoal outside of the screen, a filter stone inside of the screen, an inlet into the charcoal layer, and an outlet from the stone, a cover for the housing, and means of connection between said stone and said cover for lifting the stone out of the housing when the cover is removed.

4. In a purifier and filter device a housing, a loose layer of charcoal adjacent the periphery of the housing extending from top to bottom, a screen separator wall extended from top to bottom into said charcoal layer so as to confine the charcoal outside of the screen, a filter stone inside of the screen, an inlet into the charcoal layer, and an outlet from the stone, said outlet including a perforated conduit extended through the stone, means to support the stone on the lower end of the conduit, and a cover for the housing covering the ends of all the layers.

5. In a purifier and filter device a housing, a loose layer of charcoal adjacent the periphery of the housing extending from top to bottom, a screen separator wall extended from top to bottom into said charcoal layer so as to confine the charcoal outside of the screen, a filter stone inside of the screen, an inlet into the charcoal layer, and an outlet from the stone, said outlet including a perforated conduit extended through the stone, means to support the stone on the lower end of the conduit in spaced relation above the bottom of the housing, and a cover for the housing covering the ends of all the layers.

6. In a purifier and filter device a housing, a loose layer of charcoal adjacent the periphery of the housing extending from top to bottom into said charcoal layer so as to confine the charcoal outside of the screen, a filter stone inside of the screen, and inlet into the charcoal layer, and an outlet from the stone, said outlet including a perforated conduit extended through the stone, means to support the stone on the lower end of the conduit in spaced relation above the bottom of the housing, a cover for the housing covering the ends of all the layers, and packings at each end of the stone to confine all flow of water through the sides of the stone.

7. In a filtering and purifying device the combination with a housing, a loose layer of filtering material in the housing, a conduit conducting the liquid to said layer, and a solid layer of filtering material extended from an end into said housing, of another conduit for conducting the liquid from said solid layer being so secured into said solid layer as to serve also as a handle for lifting said solid layer out of said housing through said end of the housing.

JAMES E. MICHAUD.